(12) United States Patent
Peterson (10) Patent No.: US 6,672,542 B2
(45) Date of Patent: Jan. 6, 2004

(54) METHOD AND SYSTEM FOR CONTROLLING THE ECCENTRICITY OF A NEAR-CIRCULAR ORBIT (75) Inventor: Glenn E. Peterson, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/162,484

(22) Filed: Jun. 3, 2002

(65) Prior Publication Data

US 2003/0222179 A1 Dec. 4, 2003

(51) Int. Cl.⁷ ................................. B64G 1/10
(52) U.S. Cl. ................................. 244/158 R
(58) Field of Search ............... 244/158 R, 169, 244/172; 701/226

(56) References Cited

U.S. PATENT DOCUMENTS

| 4,943,014 A | * | 7/1990 | Harwood et al. |
| 5,263,666 A | * | 11/1993 | Hubert et al. |
| 5,400,252 A | * | 3/1995 | Kazimi et al. |
| 5,595,360 A | * | 1/1997 | Spitzer |
| 5,716,029 A | * | 2/1998 | Spitzer et al. |
| 6,042,058 A | * | 3/2000 | Anzel |
| 6,116,543 A | * | 9/2000 | Koppel |
| 6,286,787 B1 | * | 9/2001 | Fleeter |
| 6,305,646 B1 | * | 10/2001 | McAllister et al. |

FOREIGN PATENT DOCUMENTS

EP 0047211 * 3/1982 ................. 244/169

* cited by examiner

Primary Examiner—Tien Dinh
(74) Attorney, Agent, or Firm—Henricks, Slavin & Holmes LLP (57) ABSTRACT A method and system for controlling the eccentricity of a near-circular orbit are embodied in a burn controller for an orbiting object (such as a satellite) that is configured to control burns to occur at either an apogee or a perigee of the orbit to effect a desired change in the eccentricity of the orbit. These burns occur at either an apogee or a perigee of the orbit depending upon the satellite's location in the long-period motion of the argument of perigee.

18 Claims, 7 Drawing Sheets

FIG. 1

NON-FROZEN ORBIT

FIG. 2A

FROZEN ORBIT

METHOD AND SYSTEM FOR CONTROLLING THE ECCENTRICITY OF A NEAR-CIRCULAR ORBIT

BACKGROUND OF THE INVENTION

Several constellations currently inhabit the LEO environment (OrbComm, Iridium, GlobalStar) and more are in the deployment stages or are planned for the future (Teledesic, etc.). Some of these constellations take advantage of orbital dynamics to maintain the same perigee location in inertial space with a non-varying value of the eccentricity. These are called "frozen" orbits; the optimal eccentricity of a frozen orbit is called the "frozen eccentricity". Frozen orbits can assist in the operational aspects of a constellation by providing easier and more consistent satellite-to-satellite linkage as well as reducing the residence times of satellite failures.

The problem, however, lies in the initial deployment of the vehicle or subsequent errors in the maneuvering. For near-circular orbits, the frozen eccentricity is difficult to achieve during deployment and the only currently known way to drive the eccentricity to the frozen value once a vehicle has been deployed is to either conduct radially directed burns or transfer Hohmann burns in pairs. But radial burns often interfere with operational constraints and pairs of Hohmann burns require extra fuel. Thus, the frozen quality of the orbit is difficult to achieve, and the effectiveness of using the frozen orbit within the constellation is therefore diminished. Under current stationkeeping algorithms, changing the eccentricity in near-circular orbits is either costly or can only be accomplished by burning in the radial direction. Operational constraints often prohibit burning in these ways. Accordingly, it would be desirable to be able to move the eccentricity to the frozen value without interfering with mission operations, or without requiring extra fuel beyond that which is expended through typical drag-compensation burns in the along-track direction when the satellites occupy a regime low enough that drag is the dominant non-conservative force.

BRIEF DESCRIPTION OF THE DRAWINGS

Detailed description of embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

Figure 1:
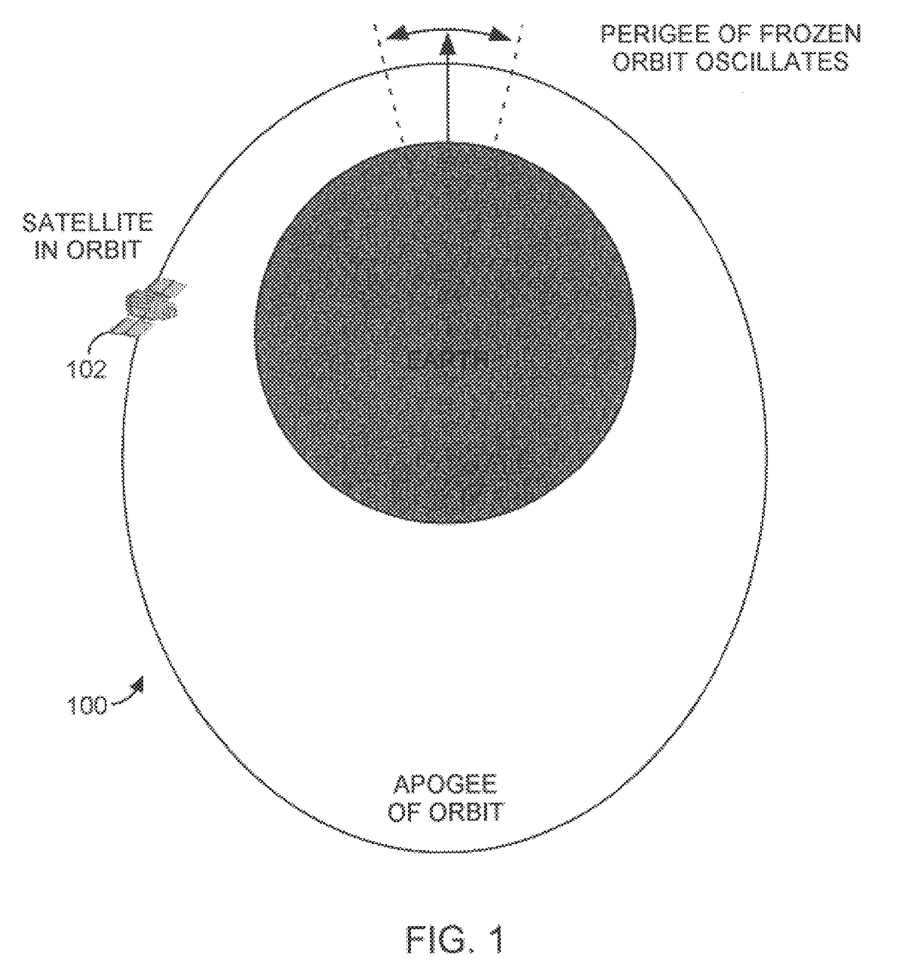
FIG. 1 illustrates an orbiting object, a satellite, in a frozen low earth orbit (LEO)

A method and system for controlling the eccentricity of a near-circular orbit according to the present invention are embodied in a burn controller for an orbiting object (such as a satellite) that is configured to control burns to occur at either an apogee or a perigee of the orbit to effect a desired change in the eccentricity of the orbit. FIG. 1 illustrates an exemplary operating environment 100 for a satellite 102 in a frozen low earth orbit (LEO).

Figure 2A:
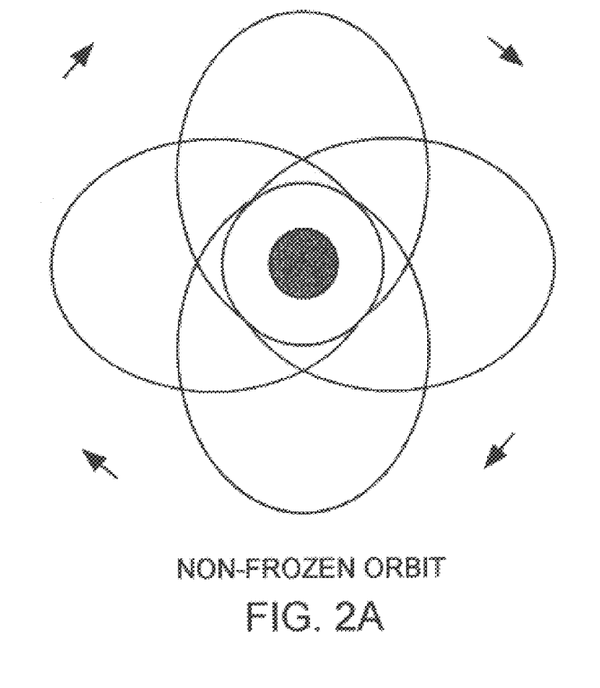
FIG. 2A illustrates a non-frozen orbit.
Figure 2B:
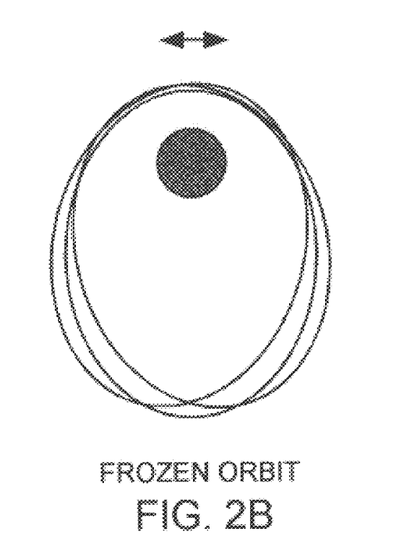
FIG. 2B illustrates a frozen orbit.

FIGS. 2A and 2B illustrate differences between a non-frozen and a frozen orbit. With respect to the non-frozen orbit (FIG. 2A), earth oblateness causes the perigee to secularly precess, i.e., the perigee rotates through a full cycle in the plane of the orbit. With respect to the frozen orbit (FIG. 2B), a judicious choice of initial LEO conditions allows the perigee to be frozen, i.e., the perigee does not rotate, but stays in a confined region of space. Frozen orbits help to facilitate good satellite-to-satellite linkage, altimetry (consistent height reproduction), and reduced collision risk ("thins" the active constellation shell).

According to the present invention, fuel burns are controlled such that the eccentricity of the orbit of an object (e.g., a satellite) is moved to the frozen value using drag compensation burns in the along-track direction (of the velocity vector associated with the orbiting object) thereby not interfering with mission operations or requiring extra fuel beyond that ordinarily required to effect drag compensation. In one embodiment, burn targeting is implemented via a controller that executes a stationkeeping algorithm that uses along-track burns to slowly change the eccentricity. These burns are conducted in concert with the normal along-track burns necessary to compensate for the effects of drag. Thus, the change in eccentricity is achieved without any additional fuel consumption.

Figure 3A:
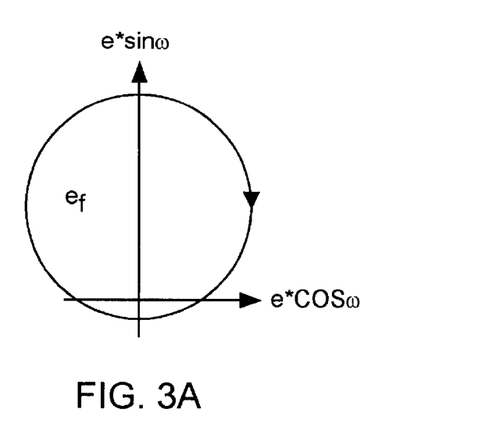
FIGS. 3A–3C illustrate eccentricity vectors for non-frozen, frozen and ideally frozen orbits, respectively.
Figure 3B:
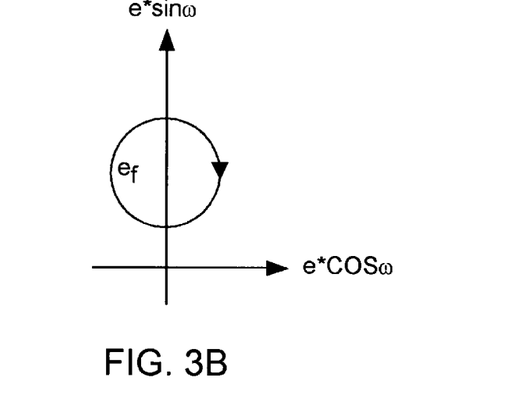
Figure 3C:
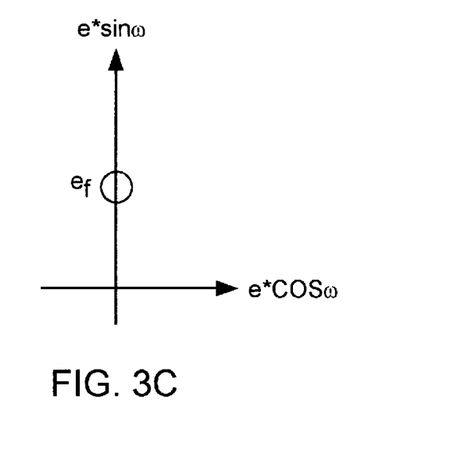

FIGS. 3A–3C illustrate eccentricity vectors for non-frozen, frozen and ideally frozen orbits, respectively. For near-circular orbits, the eccentricity (e) and the argument of perigee ($\omega$) can be ill-defined as orbital elements. In such situations, it is often more useful to consider the motion of the eccentricity vector instead of the usual orbit elements. The eccentricity vector is defined as:

$$\begin{pmatrix} \xi \\ \eta \end{pmatrix} = \begin{pmatrix} e\cos\omega \\ e\sin\omega \end{pmatrix} \quad (1)$$

Frozen orbits are created through the targeting of the eccentricity vector of a near circular orbit (e.g., eccentricity<0.01) to a certain location. At this location, the odd zonal components of the geopotential combine with the even zonals to create a stable value of the eccentricity. The vector then stays in the vicinity of this stable value revolving about it with a periodicity determined from the secular precession in the perigee due to $J_2$:

$$\omega_{sec} = \frac{3}{4} n J_2 \left(\frac{a_e}{p}\right)^2 [4 - 5\sin^2 i] \quad (2)$$

where $\omega$ is the argument of perigee, p is the semi-latus rectum, n is the mean motion, i is the inclination, $a_e$, is the Earth's radius, and $J_2$ is the value for the Earth's oblateness.

Figure 4A:
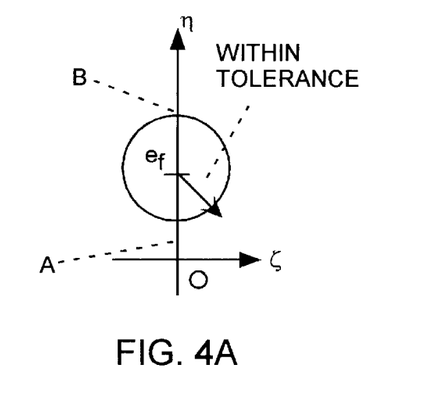
FIGS. 4A and 4B illustrate eccentricity vector motion for frozen and non-frozen orbits, respectively.
Figure 4B:
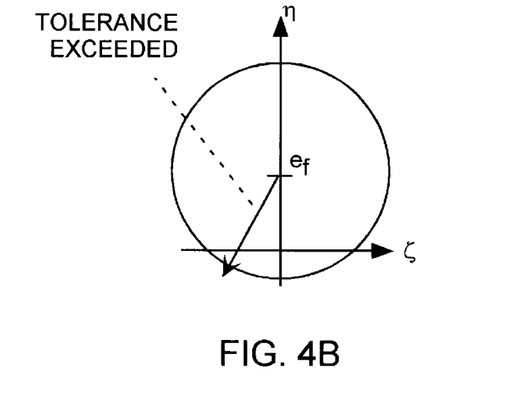

FIGS. 4A and 4B illustrate eccentricity vector motion for frozen and non-frozen orbits, respectively. These figures show the variation of the eccentricity vector over a perigee period (~110 days for a near-polar satellite at 750 km altitude). The center point of the circle formed by the eccentricity vector motion is referred to as the frozen eccentricity (depicted as $e_f$ in the figures). When the radius of the circle exceeds the value of the frozen eccentricity (the origin O of the phase plane $\zeta$-$\eta$ plot lies within the circle), then the vector loses its stability and starts to cycle throughout the orbit. If it is desired to maintain the perigee in a confined region in space, then the radius of the circle must be held less than the frozen value. Thus, in order to achieve a frozen orbit, the tolerance on the eccentricity vector motion (radius of the circle) must be less than the value of the frozen eccentricity. Cook, G. E., Perturbations of Near-Circular Orbits by the Earth's Gravitational Potential, *Planet. Space Sci.*, Vol. 14, pp 433–444, 1966, incorporated herein by reference, gives the formula for the long period behavior of the eccentricity vector as:

$$\begin{pmatrix} \Delta\xi \\ \Delta\eta \end{pmatrix}_{LP} = \begin{pmatrix} \delta e_T \cos(\omega_{sec} t + \alpha) \\ \delta e_T \sin(\omega_{sec} t + \alpha) \end{pmatrix} + \begin{pmatrix} 0 \\ e_f \end{pmatrix} \quad (3)$$

where $\delta e_T$ is the initial tolerance (radius of the circle) and $\alpha$ is the phase angle determined by the initial conditions at time t=0, $\omega_{sec}$ is the secular precession rate of the argument of perigee whose motion is due to the even zonals ($J_2$ typically dominates), and $e_f$ is the frozen eccentricity defined by:

$$e_f = \frac{J_3}{2J_2}\left(\frac{a_e}{p}\right)\sin i + \frac{4}{3}\sum_{m=5}^{odd}(m-1)\frac{J_m}{J_2}\left(\frac{a_e}{p}\right)^{m-2}\frac{F_{m,0,(m-1)/2}(i)}{4-5\sin^2 i} \quad (4)$$

where the $J_m$ are the values of the zonal geopotential coefficients for the mth zonal, and F is Kaula's inclination function. See, Kaula, W. M., Theory of Satellite Geodesy, Blaisdell Publishing Co., Waltham, Mass, 1966, incorporated herein by reference. Because the frozen value is solely in the $\eta$ component, the stable point will occur at an argument of perigee equal to 90° (or –90°, depending upon the inclination). The eccentricity vector will thus oscillate about an argument of perigee of either ±90° with an amplitude that is driven by the value of the tolerance; as the tolerance goes to zero, the argument of perigee will approach ±90°.

Figure 5:
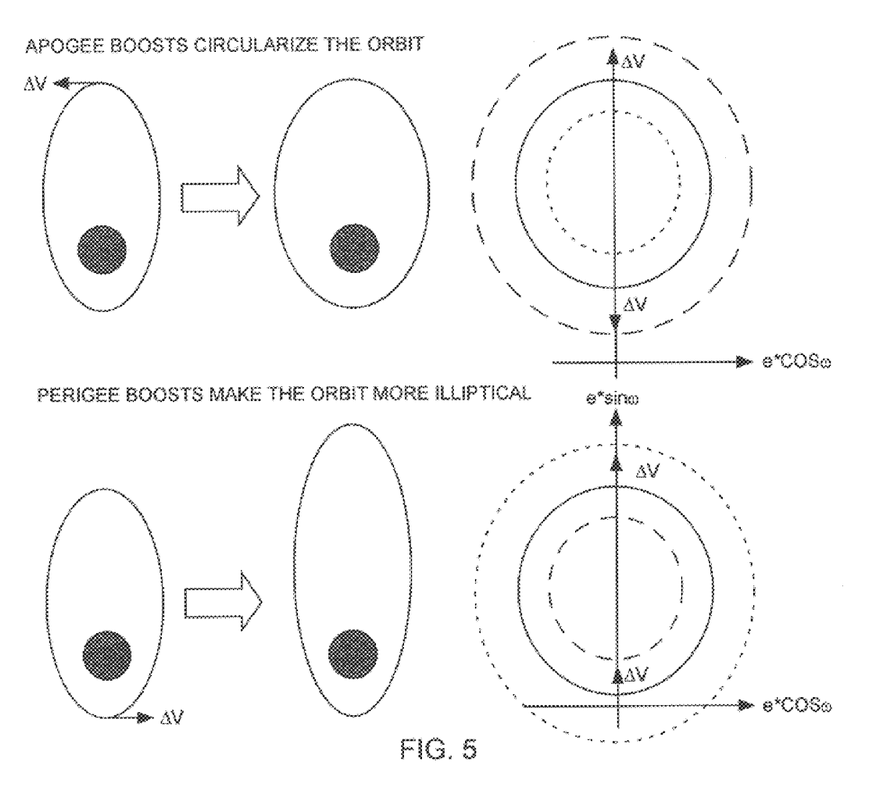
FIG. 5 illustrates eccentricity vector change.

A gradual approach towards changing the tolerance on the eccentricity vector ($\delta e_T$) is possible that does not require the vehicle to be reoriented nor does it require any extra deltaV over the expected stationkeeping budget. In simple terms, if the system is constrained to produce only transverse (to a radius of the orbit) stationkeeping burns, i.e. drag compensation, then the eccentricity will experience its greatest change at apogee and perigee. If the burns are conducted only at perigee or apogee, then the eccentricity can be controlled and driven to the frozen value irrespective of other operational issues. FIG. 5 illustrates eccentricity vector change. As can be seen from the figure, apogee boosts circularize the orbit and perigee boosts make the orbit more elliptical.

Figure 6A:
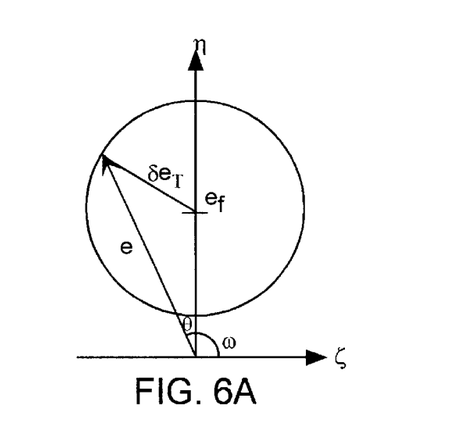
FIGS. 6A and 6B illustrate eccentricity vectors before and after burn, respectively.
Figure 6B:
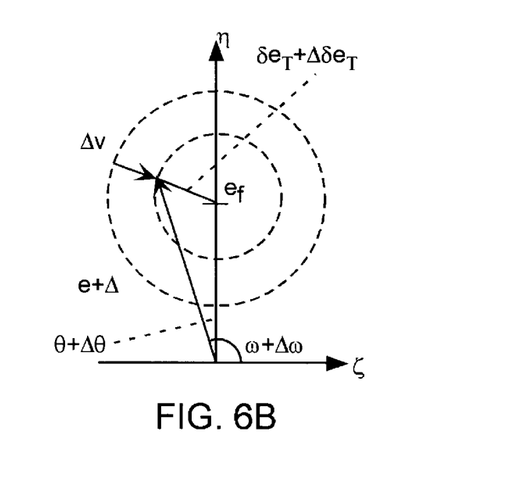

FIGS. 6A and 6B illustrate eccentricity vectors before and after burn, respectively. The change in the tolerance, $\Delta\delta e_T$, due to an arbitrary impulsive burn can be found from the Law of Cosines for before the burn:

$$\delta e_T^2 = e^2 + e_f^2 - 2e\, e_f \cos\theta \quad (5)$$

and after the burn:

$$(\delta e_T + \Delta\delta e_T)^2 = (e+\Delta e)^2 + e_f^2 - 2(e+\Delta e)e_f \cos(\theta+\Delta\theta) \quad (6)$$

where the $\Delta$'s are the changes in the elements resulting from the burn. If the convention for the angle $\theta$ is taken to be positive in the direction of the eccentricity vector motion, then the cosine of $\theta$ is equal to the sine of the argument of perigee, $\omega$, and the sine of the angle $\theta$ is equal to the opposite of the cosine of the argument of perigee:

$$\sin\omega = \cos\theta \quad \cos\omega = -\sin\theta \quad (7)$$

Substituting into Equation 6 and solving to first order yields:

$$\delta e_T \Delta e_T = e\Delta e - e_f \sin\omega\Delta e - e e_f \cos\omega\Delta\omega \quad (8)$$

The equations relating the change in the orbit elements that result from a small impulsive burn in the eccentricity and argument of perigee are (where the subscripts r,t,w refer to the radial, transverse (along-track), and normal spacecraft-centered coordinate frame):

$$\Delta e = \frac{\sqrt{1-e^2}\sin v}{na}\Delta v_r + \frac{\sqrt{1-e^2}}{nae}\left[\frac{p}{r}-\frac{r}{a}\right]\Delta v_t \quad (9)$$

$$\Delta\omega = \frac{-\sqrt{1-e^2}\cos v}{nae}\Delta v_r + \frac{\sqrt{1-e^2}}{nae}\left[1+\frac{r}{p}\right]\sin v\Delta v_t - \frac{r\sin u \cot i}{na^2\sqrt{1-e^2}}\Delta v_w$$

where v is the true anomaly, $\alpha$ is the semi-major axis, and u is the argument of latitude.

The corresponding changes in the components of the eccentricity vector are found from Equation 1:

$$\Delta\xi = \frac{\sin u}{na}\Delta v_r + \frac{2}{na}\cos u\Delta v_t + \eta\frac{\sin u \cot i}{na}\Delta v_w \quad (10)$$

$$\Delta\eta = -\frac{\cos u}{na}\Delta v_r + \frac{2}{na}\sin u\Delta v_t - \xi\frac{\sin u \cot i}{na}\Delta v_w$$

The relation between the changes in the eccentricity and the components of the eccentricity vector is:

$$e\Delta e = \xi\Delta\xi + \eta\Delta\eta \quad (11)$$

Because radial burns often require disruption of mission operations, and because normal burns must be large to make up for the near-circularity of the LEO satellites, according to the present invention transverse burns are employed for changing the eccentricity vector. Also, if it is desired to minimize fuel usage, then the usual transverse stationkeeping burns are used to change the eccentricity vector. Considering only the transverse burns, Equation 8 reduces for near circular orbits to:

$$\Delta\delta e_T = \frac{2}{na}\frac{1}{\delta e_T}\{\xi\cos u + (\eta - e_f)\sin u\}\Delta v_t \quad (12)$$

Equation 12 implies that if the burns are targeted at specific points in the orbit, then the tolerance can be brought down at the same time as the normal stationkeeping burns are conducted. Namely, without increasing the deltaV budget at all and in the normal course of mission operations, the eccentricity vector tolerance can be decreased to an effectively arbitrary level. Also, it should be noted that if the burns are constrained to take place at apogee and perigee, then from Equation 9 it can be seen that a purely transverse burn will affect only the eccentricity and not the argument of perigee (sin v=0). In essence, transverse burns at apogee and perigee change the magnitude of the eccentricity vector, but not its direction. If burns are not perfectly constrained to take place at apogee and perigee, the principles of the present invention are still applicable albeit with a decrease in efficiency.

If only the mean motion of the eccentricity vector is considered, then an additional substitution involving Equation 3 can be made:

$$\Delta \delta e_T = \frac{2}{na} \cos(u - \omega_{sec} t - \alpha) \Delta v_t \qquad (13)$$

Since $\alpha$ is a constant phase offset, it can be set to any value with no loss of generality as long as the initial time is chosen to correspond appropriately. Assuming a convenient value, the initial phase angle can be set to $-90°$ so that a zero value for $\omega t + \alpha$ corresponds to a zero value for $\theta$. This occurs when the eccentricity vector is at the bottom of its cycle, point A in FIG. 4A. Using the definition for the argument of latitude and assuming the burns take place at either apogee or perigee, Equation 13 can be expressed as:

$$\Delta \delta e_T = \frac{2}{na} \cos(\omega - \omega_{sec} t \pm 90°) \Delta v_t \qquad (14)$$

where the $\pm$ sign indicates whether the burn takes place at perigee (+) or apogee (−). Expressions relating the argument of perigee to the time in the eccentricity vector cycle are found by equating the definition of the eccentricity vector (Equation 1) to the mean motion of the eccentricity vector (Equation 8):

$$\sin\omega = \frac{e_f}{e} + \frac{\delta e_T}{e} \sin(\omega_{sec} t + \alpha) \qquad (15)$$

$$\cos\omega = \frac{\delta e_T}{e} \cos(\omega_{sec} t + \alpha)$$

where the eccentricity at any point in the cycle is given by the Law of Cosines:

$$e^2 = (\delta e_T)^2 + 2 e_f \delta e_T \sin(\omega_{sec} t + \alpha) + e_f^2 \qquad (16)$$

Combining these expressions gives the argument of perigee solely in terms of the frozen eccentricity, the current tolerance, and the time in the cycle. Substituting yields (and recalling that the phase angle was chosen to be $=90°$):

$$\Delta \delta e_T = \mp \frac{2}{na} \left\{ \frac{e_f \cos \omega_{sec} t - \delta e_T}{e} \right\} \Delta v_t \qquad (17)$$

where now the minus sign depicts burns at perigee and the plus sign for burns at apogee. Because it is desired to have negative changes in the tolerance, then whether the burn is to take place at perigee or at apogee is determined by the numerator in Equation 17. Perigee burns should be conducted when the expression in the brackets is greater than zero; apogee burns when it is less than zero. The boundary point between these two regimes is simply given when the numerator is equal to zero:

$$\cos \omega_{sec} t = \frac{\delta e_T}{e_f} \qquad (18)$$

Geometrically, this represents the point of maximum deviation for the argument of perigee. This point can also be found in terms of the components of the mean eccentricity vector. The $\eta$-component is the variable of interest since the $\xi$-component is symmetrical about the $\eta$-axis. Therefore when the mean value of the $\eta$-component is below a certain value, then the stationkeeping burns are performed at perigee; when it is above this value, drag compensation are conducted at apogee.

Figure 7:
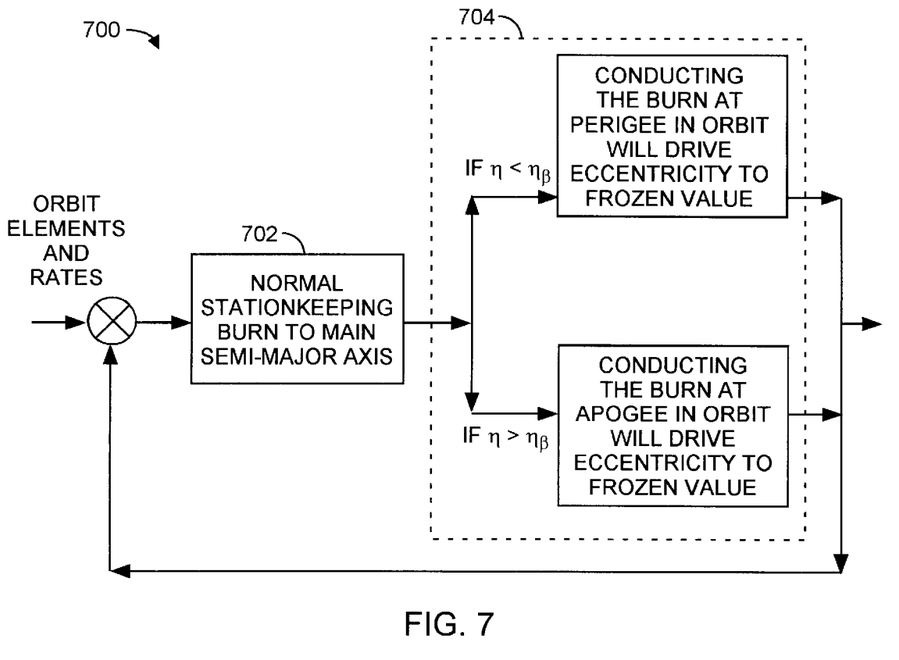
FIG. 7 is an flow diagram of an exemplary burn controller according to the present invention.

FIG. 7 is a flow diagram of an exemplary burn controller 700 according to the present invention. The exemplary controller 700 is configured as shown to provide a normal stationkeeping burn to maintain semi-major axis (block 702) and determine whether the burn is to be conducted at perigee or apogee to drive the eccentricity to the frozen value (block 704).

Figure 8:
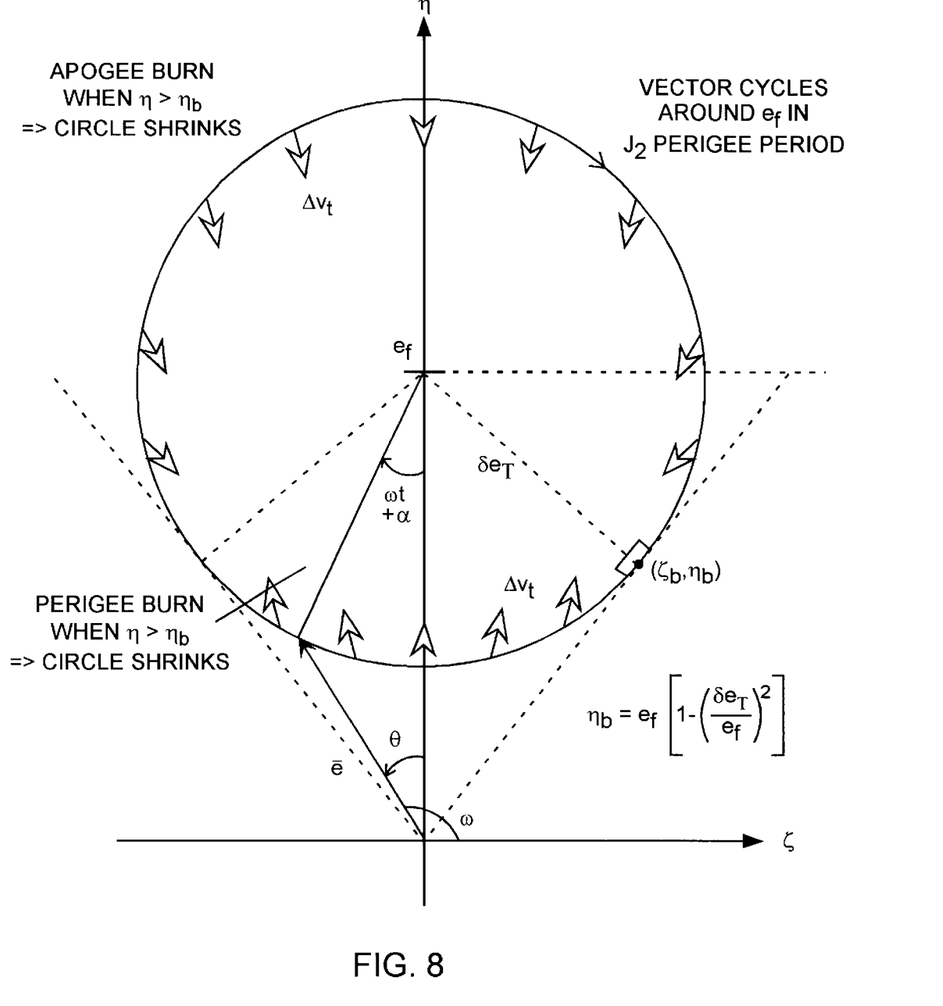
FIG. 8 illustrates an exemplary eccentricity vector control burn scenario according to the present invention.

From the geometry of FIG. 8, the limiting value of the $\eta$-component, $\eta_b$, that is equivalent to Equation 18 can be found as:

$$\eta_b = e_f \left[ 1 - \left( \frac{\delta e_T}{e_f} \right)^2 \right] \qquad (19)$$

FIG. 8 also summarizes the eccentricity vector control burn scenario. The normal drag compensation stationkeeping burns are conducted in the usual mode. The difference is that instead of doing the burns at random locations in the orbit as is usually done, the burns are targeted at either apogee or perigee (depending upon the mean eccentricity vector motion) to affect a desired change in the eccentricity. When the mean eccentricity vector is at the bottom of its perigee period cycle, the drag compensation burns are conducted at perigee; when the mean vector is at the top of its cycle, burns occur at apogee. In this manner, the eccentricity vector tolerance is slowly decreased as the normal stationkeeping burns are happening.

Because the usual stationkeeping burns are being used to effect the decrease in the tolerance, the change in the tolerance under this scenario will be very gradual. In order to discern how much time it would take for this modified stationkeeping strategy to implement a change in the eccentricity vector tolerance, Equation 17 is integrated over a perigee period. The total amount that the tolerance will decrease over the perigee period for a sample satellite in a 750 km altitude near-circular, near-polar orbit is (perigee period ~110 days):

$$(\Delta \delta e_T)_{total} = 1.705 \times 10^{-4} <\Delta v_t> \qquad (20)$$

where $<\Delta v_t>$ is the average value of the normal stationkeeping deltaV over that same perigee period in m/sec. For example, at the time of peak solar activity when drag is greatest, the sample satellite can expect to require about 4 m/s of stationkeeping deltaV to counteract the effects of drag per year. This translates to an average stationkeeping deltaV over the 110.5 day perigee period of 1.21 m/sec, in turn giving a decrease in the eccentricity vector tolerance of $2 \times 10^{-4}$. The minimum stationkeeping deltaV occurs at the minimum of the solar cycle and will be about 0.15 m/sec for that year; this translates to an average perigee period deltaV of 0.045 m/sec and a decrease in the tolerance of $8 \times 10^{-6}$. This implies that in order to reduce a sample tolerance of 0.00074 down to a near-zero value, then 3–4 perigee periods (about 1 year) would be required during the time of solar maximum, while the benefit gained in the tolerance is virtually non-existent during the times of solar minimum.

Thus, according to an embodiment of the present invention, the eccentricity vector is controlled and driven closer to the frozen value without any increase in the usual fuel budget by conducting the drag-compensation burns at apogee or perigee depending upon the location of the satellite in its long period motion of the perigee.

Although the present invention has been described in terms of the embodiment(s) above, numerous modifications and/or additions to the above-described embodiment(s) would be readily apparent to one skilled in the art. It is intended that the scope of the present invention extends to all such modifications and/or additions.

I claim:

1. A method for controlling the eccentricity of a near-circular orbit, comprising:

targeting stationkeeping burns for a object in a low earth orbit (LEO) to occur only at either an apogee or a perigee of the orbit depending upon motion of an eccentricity vector that points to a position in the LEO rather than to the sun.

2. A method for controlling the eccentricity of a near-circular orbit, comprising:

controlling burns for an object in an orbit to occur at either an apogee or a perigee of the orbit depending upon mean eccentricity vector motion to effect a desired change in an eccentricity of the orbit.

3. The method for controlling the eccentricity of a near-circular orbit of claim 2, wherein the burns are controlled such that a tolerance on eccentricity vector motion is less than a frozen eccentricity of the orbit.

4. The method for controlling the eccentricity of a near-circular orbit of claim 2, wherein the burns are controlled to be along-track with respect to the orbit.

5. The method for controlling the eccentricity of a near-circular orbit of claim 2, wherein the burns are controlled to be transverse to a radius of the orbit.

6. The method for controlling the eccentricity of a near-circular orbit of claim 2, wherein the burns are controlled such that a magnitude of the eccentricity changes, but not its direction.

7. The method for controlling the eccentricity of a near-circular orbit of claim 2, wherein the burns are controlled to maintain a semi-major axis.

8. The method for controlling the eccentricity of a near-circular orbit of claim 2, wherein the burns are controlled to both counteract effects of drag and to drive the eccentricity to the frozen value.

9. The method for controlling the eccentricity of a near-circular orbit of claim 8, Wherein the burns are controlled such that no additional fuel beyond a normal drag compensation fuel budget is required to drive the eccentricity.

10. The method for controlling the eccentricity of a near-circular orbit of claim 2, wherein the object comprises a satellite.

11. A system for controlling the eccentricity of a near-circular orbit, comprising:

a bum controller for an object in an orbit, the bum controller being configured to control burns to take place at an apogee or a perigee of the orbit depending upon components of a mean eccentricity vector to drive an eccentricity of the orbit to a frozen value.

12. The system for controlling the eccentricity of a near-circular orbit of claim 11, wherein the controller is configured to control the burns to be along-track with respect to the orbit.

13. The system for controlling the eccentricity of a near-circular orbit of claim 11, wherein the controller is configured to control the burns to be transverse to a radius of the orbit.

14. The system for controlling the eccentricity of a near-circular orbit of claim 11, wherein the controller is configured to control the burns such that a magnitude of the eccentricity changes, but not its direction.

15. The system for controlling the eccentricity of a near-circular orbit of claim 11, wherein the controller is configured to control the burns to maintain a semi-major axis.

16. The system for controlling the eccentricity of a near-circular orbit of claim 11, wherein the controller operates under control of a stationkeeping algorithm that controls the burns to both counteract effects of drag and to drive the eccentricity to the frozen value.

17. The system for controlling the eccentricity of a near-circular orbit of claim 16, wherein the stationkeeping algorithm controls the burns such that no additional fuel beyond a normal drag compensation fuel budget is required to drive the eccentricity.

18. The system for controlling the eccentricity of a near-circular orbit of claim 11, wherein the object comprises a satellite.

* * * * *